J. C. RINGE.
LUBRICATING MEANS FOR SEWING MACHINES.
APPLICATION FILED MAY 29, 1918.
1,293,931.
Patented Feb. 11, 1919.
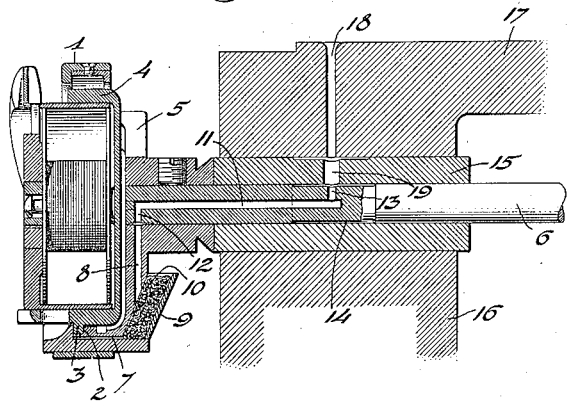
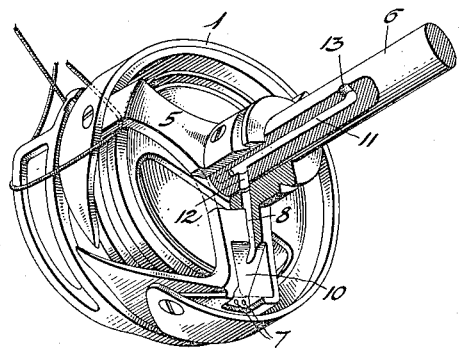
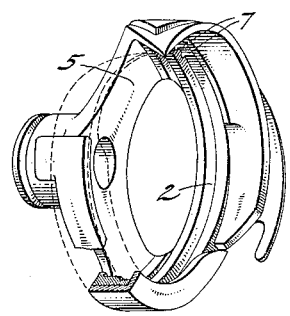
WITNESSES:
INVENTOR
BY
ATTORNEY

UNITED STATES PATENT OFFICE.

JOHN C. RINGE, OF BRIDGEPORT, CONNECTICUT, ASSIGNOR TO THE SINGER MANUFACTURING COMPANY, A CORPORATION OF NEW JERSEY.

LUBRICATING MEANS FOR SEWING-MACHINES.

1,293,931. Specification of Letters Patent. Patented Feb. 11, 1919.

Original application filed February 9, 1916, Serial No. 77,123. Divided and this application filed May 29, 1918. Serial No. 237,208.

*To all whom it may concern:*

Be it known that I, JOHN C. RINGE, a citizen of the United States, residing at Bridgeport, in the county of Fairfield and State of Connecticut, have invented certain new and useful Improvements in Lubricating Means for Sewing-Machines, of which the following is a specification, reference being had therein to the accompanying drawings.

This invention relates to an improvement in the means for lubricating the bobbin-case raceways of sewing machines in which the loop-taker operates at high speed, such as the machine shown in my copending application Serial No. 77,123, filed February 9, 1916, of which the present application is a division.

The machine above mentioned produces from 3500 to 5000 stitches per minute, and as a relatively large bobbin-case is used, considerable friction and overheating would result, due to the high speed and large bearing surface between the bobbin-case and its raceway in the loop-taker body, if this raceway were not properly lubricated.

The present invention has for its objects to provide an efficient and simple lubricating means for the bobbin-case raceway, to which oil may be supplied from either above or below the bed-plate as desired, in which centrifugal force is utilized to aid in the distribution of the lubricant, which is not liable to soil the mass of lower thread, and which in addition may lubricate the shaft of the loop-taker.

The invention comprises a rotary loop-taker body having a raceway therein in which is journaled a bobbin-case bearing rib, the bobbin-case being held against rotation. The body is connected by radial arms to its operating shaft. The shaft is formed with a duct adjacent said body, one end of said duct communicating with the raceway by a duct in one of the radial arms, while the other end of the shaft duct communicates with a peripheral recess in the shaft. An oil supply inlet leads from the upper surface of the bed-plate through the shaft bearing and its bushing to the peripheral recess. A second oil inlet leads into the duct of the radial arm through an enlargement on said arm, and absorbent material is preferably packed in said enlargement.

In the accompanying drawings, Figure 1 is a vertical longitudinal section through the loop-taker and its shaft showing a portion of the bed-plate. Fig. 2 is a perspective view of the loop-taker body and its shaft, with the shaft broken away to show the oil duct. Fig. 3 is a perspective view of the loop-taker body, showing the bobbin-case raceway therein and the outlets of the oil supply ducts.

Referring to the drawings, the numeral 1 indicates a loop-taker body having within the same a raceway 2 in which fits the bearing rib 3 of the bobbin-case 4. Radial arms 5 connect the loop-taker body to its hub on the operating shaft 6. Opening into the raceway 2 are one or more oil ducts 7 which communicate with a duct 8 in one of the radial arms 5. Said arm has a radially disposed enlargement 9 having a cavity 10 therein, said cavity being in communication with the duct 8 and being open on the side nearest the shaft. This cavity is designed to be filled with wicking or other absorbent material. The shaft 6 has a duct 11 therein in the portion nearest the loop-taker body, said duct communicating at one end by a branch 12 with the duct 8 and at the other end by a branch 13 with a peripheral recess 14 in the shaft. The shaft rotates in a bushing 15 carried by a bearing 16 below the bed-plate 17, and an oil inlet 18 in the bed-plate communicates with the peripheral recess 14 through an opening 19 in the bushing.

It will be noted that due to the radial disposition of the duct 8 and cavity 10 the distribution of the lubricant is greatly aided by centrifugal force when the machine is in operation.

The raceway may be lubricated from above the bed-plate by introducing oil in the inlet 18, thus lubricating both the shaft bearing and the raceway, or oil may be applied to the packing in the cavity 10 through the open end of the latter.

Having thus set forth the nature of the invention, what I claim herein is—

1. A sewing machine loop-taker comprising a cup-shaped body formed with a thread-cavity having an annular raceway and a tubular hub connected with said body by a radial member having a substantially radial lubricant duct extending from the bore of said hub outwardly through the radial connecting member and communicating at its outer end with said raceway.

2. A sewing machine loop-taker comprising a cup-shaped body formed with a thread-cavity having an annular raceway and a tubular hub connected with said body by a radial member having a substantially radial lubricant duct extending from the bore of said hub outwardly through the radial connecting member and communicating at its outer end with said raceway, said duct having an enlargement intermediate its extremities to afford a lubricant cavity which is open at the end thereof adjacent said hub for introduction of lubricant.

3. In a sewing machine, the combination with the frame provided with a shaft-bearing having a lubricant passage, of a rotary shaft mounted in said bearing and formed with an axial lubricant passage having longitudinally spaced transverse passages connecting the same with its exterior of which one affords communication with said lubricant passage of the bearing, and a loop-taker comprising a cup-shaped body formed with a thread-cavity having an annular raceway and a hub mounted upon said shaft and connected with said body by a radial member having a substantially radial lubricant duct communicating at one end with the second of said transverse lubricant passages of the shaft and at the other end with said raceway of the loop-taker body.

4. In a sewing machine, a bed-plate, a loop-taker body, a bobbin-case raceway therein, and means whereby said raceway may be lubricated from above the bed-plate.

5. In a sewing machine, a bed-plate, a loop-taker body, a bobbin-case raceway therein, an operating shaft for said body, a bearing for said shaft, and means whereby said bearing and raceway may be lubricated from above the bed-plate.

6. In a sewing machine, a loop-taker body, a bobbin-case raceway therein, an operating shaft for said body, and means for lubricating said raceway through said shaft.

7. In a sewing machine, a loop-taker body, an operating shaft, a radial connection therebetween, a bobbin-case raceway in said body, and means for supplying lubricant to said raceway through said connection and shaft.

8. In a sewing machine, a loop-taker body, an operating shaft therefor, a bobbin-case raceway in said body, means for supplying lubricant to said raceway through said shaft, and a plurality of inlets to said supply means.

9. In a sewing machine, a bed-plate, a loop-taker body, an operating shaft therefor, a bobbin-case raceway in said body, a lubricant supply duct extending from the upper side of the bed-plate through said shaft to the raceway, and an intermediate oil supply opening in said duct.

10. In a sewing machine, a bed-plate, a loop-taker body, a bobbin-case raceway therein, and lubricant supply means for said raceway having inlets both at the top of and below the bed plate.

11. In a sewing machine, a bed-plate, a loop-taker body, a bobbin-case raceway therein, a shaft connected to said body, a bearing for said shaft, means whereby lubricant may be supplied from above the bed-plate to said bearing and raceway, and means for supplying lubricant from below the bed-plate to said raceway.

12. In a sewing machine, a rotary loop-taker body, a bobbin-case raceway therein, and means for supplying lubricant to the raceway axially of said body.

13. In a sewing machine, a rotary loop-taker body, a bobbin-case raceway therein, and means for supplying lubricant to the raceway axially and radially of said body.

14. In a sewing machine, a rotary loop-taker body, a bobbin-case raceway therein, a support for said body, and means for supplying lubricant to said raceway through said support.

15. In a sewing machine, a movable loop-taker body, a bobbin-case raceway therein, a stationary lubricant supply means, and means movable with said body for conducting lubricant from said supply means to said raceway.

16. In a sewing machine, a movable loop-taker body, a bobbin-case raceway therein, a stationary lubricant supply means, and means utilizing centrifugal force for conducting lubricant from said supply means to said raceway.

17. In a sewing machine, a rotatable loop-taker body, a bobbin-case raceway therein, a stationary lubricant supply means, and means rotatable with said body for conducting lubricant from said supply means to said raceway.

18. In a sewing machine, a rotatable loop-taker body, a bobbin-case raceway therein, stationary lubricant supply means offset from the axis of rotation of said body, and means utilizing centrifugal force for conducting lubricant from said supply means to said raceway.

19. In a sewing machine, a rotatable loop-taker body, a bobbin-case raceway therein, a stationary lubricant supply means, and means extending partly in the direction of the axis of rotation of said body for conducting lubricant from said supply means to said raceway.

In testimony whereof, I have signed my name to this specification.

JOHN C. RINGE.